United States Patent [19]

Meinig

[11] Patent Number: 4,739,802

[45] Date of Patent: Apr. 26, 1988

[54] AIR DUCT SECTION WITH FORM FITTED CONNECTING FLANGE

[75] Inventor: Manfred Meinig, Rietheim-Weilheim, Fed. Rep. of Germany

[73] Assignee: Metu-System Meinig KG, Rietheim-Weilheim, Fed. Rep. of Germany

[21] Appl. No.: 847,170

[22] Filed: Apr. 2, 1986

[30] Foreign Application Priority Data

Apr. 6, 1985 [DE] Fed. Rep. of Germany ....... 3512669

[51] Int. Cl.$^4$ ............................................. F16L 23/00
[52] U.S. Cl. ..................................... 138/155; 138/109; 138/120; 138/DIG. 4; 138/DIG. 10; 285/405
[58] Field of Search ................. 138/109, 155, DIG. 4, 138/DIG. 10, 177, 178, 120; 285/405, 406, 424, 332, 334.5

[56] References Cited

U.S. PATENT DOCUMENTS

| 425,601 | 4/1890 | Eversman et al. | 138/DIG. 4 |
|---|---|---|---|
| 583,819 | 6/1897 | Rome | 138/DIG. 4 |
| 629,095 | 7/1899 | Stearns | 138/DIG. 4 |
| 3,559,691 | 2/1971 | Neumann | 138/109 |
| 4,304,423 | 12/1981 | Mez | 285/405 X |
| 4,552,388 | 11/1985 | Meinig | 285/405 X |

FOREIGN PATENT DOCUMENTS 1452854 8/1970 Fed. Rep. of Germany .
2203560 2/1978 Fed. Rep. of Germany .

Primary Examiner—James E. Bryant, III
Attorney, Agent, or Firm—Leonard Bloom

[57] ABSTRACT

Connecting flange portions are form fitted in one piece with an essentially hollow profile at the end of a duct wall portion of a duct section formed from sheet metal. Supporting arms of the connecting flange portions extend back to the duct wall, and are folded into folding pockets which are formed from the duct wall. To attach intermediate connectors having larger duct cross-sections, the supporting arms can have outwardly extending protrusions.

21 Claims, 3 Drawing Sheets

AIR DUCT SECTION WITH FORM FITTED CONNECTING FLANGE

FIELD OF THE INVENTION

The invention concerns a sheet metal air duct section having a duct portion and a connecting flange.

BACKGROUND OF THE INVENTION

With known air duct sections of this type as shown in German Pat. No. 2,203,560, the supporting arms of the connecting flanges, form fitted in one piece, are fastened on the outside of the duct walls by spot welding. This additional procedure not only increases the cost of manufacturing but, in addition, the spot welded points are also susceptible to corrosion and must, preferably, be coated with an anticorrosive agent. Moreover, the attained fixing of the supporting arm is only at these points and, thus, not uniformly secure over the entire length of the profile.

Furthermore, air duct sections with flange profiles are known as shown in German Pat. No. 1,452,854 which have only one flange projecting at right angles from the duct wall, the outer edge of said flange is bent back at right angles parallel to the duct wall. The opposite bent back edges are pressed together by a profile clamp which is to be slipped on. Of course, with this specific embodiment, one does not have to spot weld, however, the slipping on of the profile clamp onto the bent back edges is extremely troublesome, in particular, then when the bent back edges are easily damaged during transportation and at the construction site, which occurs very frequently. Moreover, the stability of air ducts having connection flanges of this type is unsatisfactory, since the canted flanges at the ends of the air duct sections do not offer an adequate stiffening. Problems also arise during assembly if there is insufficient room for slipping on the profile clamps.

SUMMARY OF THE INVENTION

It is an object of the present invention to provide maximum stability of the connecting flanges along with inexpensive manufacturing cost while avoiding points susceptible to corrosion, such as spot welding or rivetting. In accordance with the invention, an air duct section is provided which is made of flat sheet metal. The new air duct section includes a duct wall portion and a connectng flange portion. Both the duct wall portion and the connecting flange portion are formed from one piece of sheet metal. The duct wall portion is located in a duct wall plane, and the connecting flange portion installed at the end of the duct wall portion. The connecting flange portion has an at least partially hollow profile and includes a first wall extending from the duct wall portion, a flange wall extending from the first wall way from the first wall, and a supporting wall extending diagonally from the flange wall to the duct wall portion. The supporting wall includes a free edge which is connected with the duct all portion by means of a continuous folded seam.

This object is solved in accordance with the invention by the characterizing features of claim 1.

By folding the edge of the supporting wall into the duct wall portion, the connecting flange portion, together with the duct wall portion, forms a hollow profile having maximum stability. Because it is in one piece, no sealing problems, in particular, occur between connecting flange portion and duct wall portion. The supporting wall is secured along its entire length at the duct wall portion. No danger whatsoever of corrosion exists as a result of spot welded points, rivetting or the like. Since the required folding can be done in the same procedure as the connecting flange itself, an additional procedure for fastening the supporting arm is omitted. Only the procedure of profiling takes a little longer. In return, however, the machinery for other fastening techniques are no longer needed.

The required folding is expediently done in such a way that a folding pocket is formed directly on the duct wall portion itself, over or into which the bent edge of the supporting wall is placed. Due to the rolling against each other of the sheet metal surfaces, a sufficient rigidity of the scarf joint is thus attained, both for compressive loads and tensile loads of the supporting wall. Preferably, the folding pocket is thereby drawn outward from the duct wall, since the inner surface of the duct remains essentially smooth thereby.

In order to attain an even greater rigidity of the scarf joint also against compressive loads of the supporting arm, the folding pocket can, in an exceptional case, also be drawn into the duct interior from the duct wall. In this case, the folded in, bent edge of the supporting wall is not only firmly secured against tensile loads, but also against compressive loads. This can, in particular, by way of exception, be the case with larger ducts in the middle between the corners of the duct sections which are bolted together as a result of the sealings inserted between the flanges, while a tensile load of the supporting arm always occur in the corner area. Thus, for most uses, a folding pocket drawn outward from the duct wall is preferred.

In particular, with larger air ducts of this type, for example, having duct widths of more than 1.5 m, it is, on the one hand, due to this compressive load produced by the sealings and, on the other hand, due to the adjustment of such sheet metal parts, which can no longer be accurately controlled over greater lengths, mostly necessary to also hold the connecting flanges together at points between the fixed corner connections by so-called intermediate connectors. This is easily possible with welded or rivetted supporting arms in that intermediate connectors are placed into the edges of opposite connecting flanges at points situated between the welding spots or rivets. Due to the continuous folding in of the edge of the supporting arm, that is no longer possible with the embodiment according to the invention. This difficulty can, however, be solved by forming a protrusion which is to be very easily from fitted in the same phase of operation and extends outward from the supporting wall. A brace for adjusting the flange can then be press fitted onto the protrusions of two adjacent connecting flanges at a central point between two duct corners. Moreover, the protrusions can also serve to more easily fasten the corner elbows in the connecting flange portions in that the corner elbows have lugs which fit into the protrusions.

An essentially triangular hollow profile, having a supporting arm bent back inclined to the duct wall, is preferred. The inclined supporting wall can thereby proceed from the outer edge or from a point situated further inside the connecting flange portion extending at right angles to the duct wall. However, the supporting wall can also be led back to the duct wall in any other expedient form or inclination.

In particular, it is possible that, at first, an outwardly pointing supporting wall of the hollow profile and, subsequent to that, the remaining wall of said hollow profile are form fitted to the end of the duct wall, whereby a connecting portion ultimately comes to lie as continuation of the duct wall in its plane. The free edge of the connecting end of the supporting wall, arranged in this case at the connecting portion, can then be folded in the same manner into the folding pocket which is form fitted at the end of the duct wall.

Of course, the invention can be applied not only to one-piece air duct sections, made by canting, but also to such air duct sections which are composed of individual, flat sheets with form fitted connecting flanges or of parts which each comprise two duct walls. In this case, care must simply be taken that either the corner folded seam between two duct walls to be joined are shortened so far that the profile rolls for manufacturing and rabbetting the connecting flange have a continuous run without damaging the folded seem. In this case, the corner folded seam is, first of all, profile fitted and only then is the connecting flange made and rabbetted. Leaks resulting from the shortened corner folded seam at the duct corners can be bridged by special corner angles or sealed with a sealing agent.

Instead of that, the connecting flange portions can also be shortened so far that the profile rolls can run through unhindered onto the corner folded seam. In this case, the connecting flanges are first of all profile fitted and then the corner folded seam. Since the connecting flanges are easily shortened thereby, the corner elbows must have correspondingly longer arms.

Additional advantageous embodiments of the invention are placed under protection by the claims appended hereto.

BRIEF DESCRIPTION OF THE DRAWINGS

Embodiments of the invention are explained in greater detail with reference to the drawings, showing.

DESCRIPTION OF THE PREFERRED EMBODIMENTS

Figure 1:
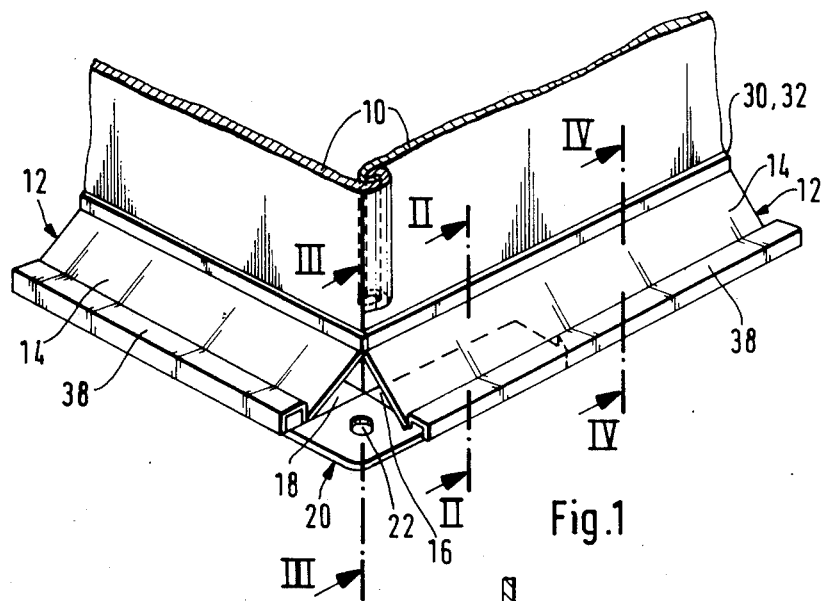
FIG. 1 is partial oblique view of the end of an air duct section according to the invention, FIG. 2 a section along the line II—II in FIG. 1, FIG. 3 a section along the line III—III in FIG. 1, FIG. 4 a section along the line IV—IV in FIG. 1 and FIGS. 5 to 8 sections corresponding to FIG. 2 through other embodiments of the invention.

The same reference numbers are used in all drawings for the same or corresponding parts.

With the embodiment shown in FIGS. 1 to 4, a connecting flange portion 12, having an essentially triangular profile, is form fitted in one piece to each of the ends of the duct walls 10 of a duct wall portion of an air duct section consisting of flat sheet metal. One supporting wall 14, bent back diagonally to the duct wall 10, and one flange wall 17, at right angles to the duct wall 10, are thereby provided in each case. A first wall also extends from the duct wall 10 to the flange wall 17. The supporting arms 18, which are at right angles on top of one another, are inserted by corner elbows, generally designated with 20, into the profile 16, open at the corners, of the connecting flange portion 12. Each of the corner elbows 20 of the supporting arms 18 have in their apex a screw opening 22 for inserting screw bolts 24, onto which nuts 26 are threaded in such a way that adjacent connecting flanges 12 are secured in the corner areas of the air duct sections. Sealings 28 are thereby inserted between the adjacent connecting flanges 12 (see FIGS. 3 and 4).

Figure 2:
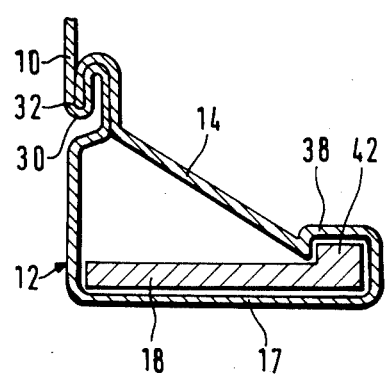
Figure 3:
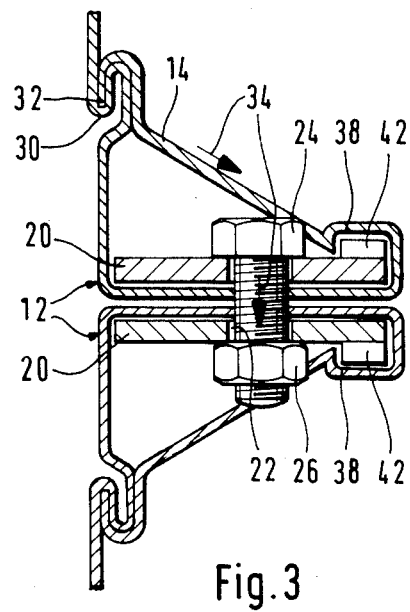
Figure 4:
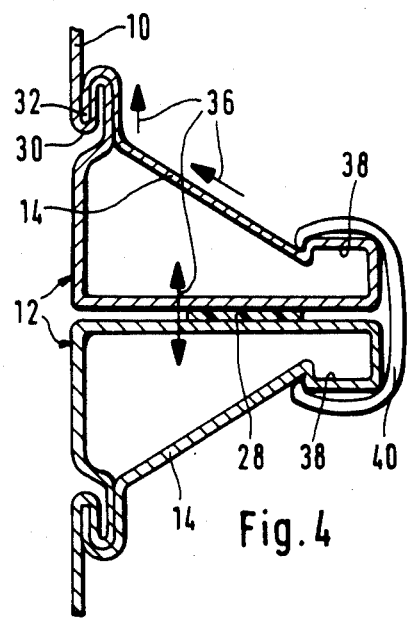

As shown in FIGS. 2 to 4, a folding pocket 30 is drawn outward from the duct wall 10, said folding pocket pointing away from the connecting flange portion 12. The free edge 32, bent in a hook-like manner in profile, of the supporting arm 14 of each connecting flange portion 12 is placed into this folding pocket and then fastened by rolling against one another of the rabbetted parts to form a folded seam.

The arrows 34 in FIG. 3 show that the supporting wall 14 is tensile loaded in the corner area as a result of being screwed with the screw bolts 24. Fold 30, 32 forms a folded seam offers an excellent resistance to this tensile load.

The arrows 36 on FIG. 4 reveal that a compressive load, although smaller, is exerted onto the supporting wall 14 in a central area between two corner connections, according to FIG. 3, by the inserted sealings 28. With a good tightening of fold 30, 32, this supporting arm easily withstands the occurring compressive forces.

In the section furthest away from the duct wall 10, in this embodiment, each supporting wall 14 has a protrusion 38, which is almost rectangular in profile, extending outward almost parallel to the duct wall 10. As can be seen in FIG. 4, a brace 40, effecting the adjustment of the connecting flanges in a central area between the corner elbows 20, can be press fitted onto the protrusions 38 of two adjacent connecting flanges portions 12.

As can be seen, in particular, in FIGS. 2 and 3, the arms 18 have lugs 42, at right angles in the cross-section, along an edge, each of said lugs fitting into a protrusion 38 and thus serving to facilitate the fixing of the corner elbows 20 prior to screwing down the nuts 26.

Figure 5:
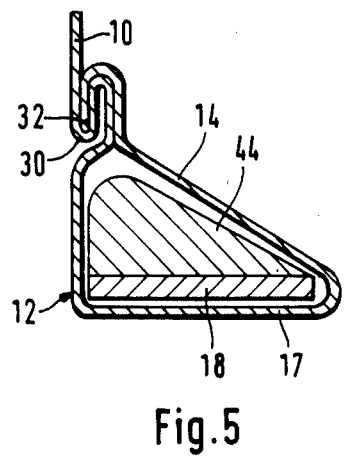

The embodiment shown in FIG. 5 is different from the thusfar described embodiments only in that the protrusion 38 is missing. This embodiment is quite sufficient for many uses, in particular, with smaller duct cross-sections. In this case, the arms 18 of the corner elbows 29 have lugs 44, which extend over their entire surface, having almost a triangular cross-section, said lugs fitting into the connecting flanges 12 so that the corner elbows are held.

Figure 6:
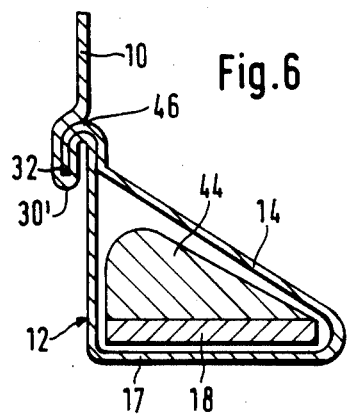
Figure 7:
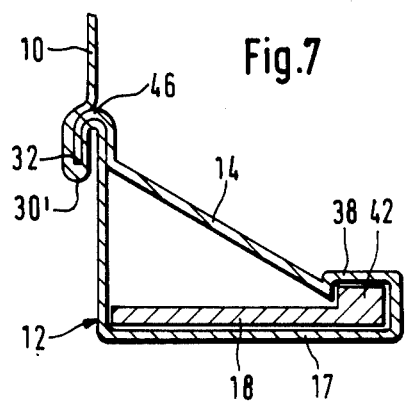

In FIGS. 6 and 7, two embodiments are provided with folding pockets 30', which are drawn from the duct wall 10 into the duct and point to the respective connecting flange portion 12, the edge 32 of the supporting wall 14, bent in a hook-like manner, folded into said folding pocket 30' to form a folded seam. In this embodiment, the scarf joint 30', 32 can absorb the compressive force or pressure 36, occurring in accordance with FIG. 4, as well as the tension force or traction 34, occurring in accordance with FIG. 3. Edge 32 is also satisfactorily held when strong pressures 36 occur by part 46 of the folding pocket 30', which is adjacent to the hook-shaped edge 32 and points outward.

Otherwise, FIG. 7 corresponds to the embodiment according to FIG. 2 with respect to the construction of protrusion 38 and lug 42, and FIG. 6 to the embodiment according to FIG. 5 with respect to the missing protrusion and lug 44.

Figure 8:
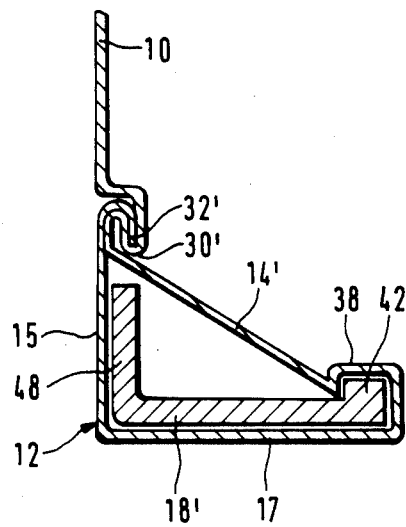

In the embodiment according to FIG. 8, after forming a folding pocket 30', arranged outside the duct wall plane and pointing away from the connecting flange portion 12, a supporting arm 18 is first of all form fitted, then the protrusion 38 and the flange part 17, projecting at right angles from the duct wall 10, and a connecting arm 15, which is parallel to the duct wall 10, forms the closure. The edge 32' of the first wall 15, which is bent outward in a hook-like manner, is folded from the inside into the folding pocket 30'. This embodiment also results in a very good securing of the connecting flange portion 12, since, for example, compressive loads, occurring in the supporting wall 14', are absorbed directly by the duct wall 10. The arms 18' of the corner elbows 20 have, in this embodiment, in addition to the lugs 42, for an even better fastening, angular unit sections 48 adjacent to the supporting wall 14'.

The embodiments of the invention in which an exclusive property or privilege is claimed are defined as follows:

1. An air duct section made of flat sheet metal, said duct section including a duct wall portion located in a duct wall plane and a connecting flange portion form fitted in one piece, said connecting flange portion located at the end of said duct wall portion, said connecting flange portion having an at least partially hollow profile and including a first wall extending from said duct wall portion, a flange wall extending from said first wall away from said first wall, and a supporting wall extending from said flange wall to said duct wall portion, said supporting wall including a free edge being connected with said duct wall portion by means of a continuous folded seam wherein a folding pocket, arranged outside the duct wall plane and pointing away from the connecting flange portion is formed by the duct wall portion, the free edge of the supporting wall, bent in a hook-like manner in profile, being disposed over said folding pocket.

2. An air duct section according to claim 1, in which the supporting wall has an outwardly extending, continuous protrusion in its part which is furthest away from the duct wall plane.

3. An air duct section according to claim 1 or 2, in which the hollow profile of the connecting flange portion is essentially triangular and the supporting wall is bent back and inclined to the duct wall portion.

4. An air duct section according to claim 1 or 2, in which the hollow profile of the connecting flange portion is essentially triangular and the supporting wall is bent back and inclined to the duct wall portion, and in which said continuous connection folded seam is comprised of a connecting arm of said duct wall portion butting against the free edge of the supporting wall and lies in the plane of the duct wall portion.

5. An air duct section made of flat sheet metal, said duct section including a duct wall portion located in a duct wall plane and a connecting flange portion form fitted in one piece, said connecting flange portion located at the end of said duct wall portion, said connecting flange portion having an at least partially hollow profile and including a first wall extending from said duct wall portion, a flange wall extending from said first wall away from said first wall, and a supporting wall extending from said flange wall to said duct wall portion, said supporting wall including a free edge being connected with said duct wall portion by means of a continuous folded seam wherein a folding pocket, arranged with the duct wall plane, pointing away from the connecting flange portion, is formed by the duct wall portion, the free edge of the supporting wall bent in a hook-like manner in profile, being disposed in said folding pocket.

6. A pair of air duct sections, comprising:
a first air duct section according to claim 1 or 5,
a first supporting arm being insertible into said first connecting flange portion of said first air duct section at the corner thereof, said first supporting arm leading back to said first wall and adjacent to said flange wall,
an adjacent second air duct section according to claims 2 or 3,
a screw connection connecting a first connecting flange portion with an adjacent second connecting flange portion of said second duct section, said screw connection extending through the first supporting arm in the first connecting flange portion at a corner thereof and through the second supporting arm in the adjacent second connecting flange portion at a corner thereof of an adjacent second duct section.

7. An air duct section according to claim 6, wherein said supporting arm has an aperture for receiving said screw connection therethrough.

8. A pair of air duct sections according to claim 6, in which at least one supporting arm has a lug which fits into the protrusion in the supporting wall.

9. A pair of air duct sections according to claim 8, in which at least one supporting arm has an angular section parallel to a duct wall portion.

10. A pair of air duct sections according to claim 6, in which at least one supporting wall has an outwardly extending, continuous protrusion in its part which is furthest away from the duct wall plane.

11. A pair of air duct sections according to claim 10, in which at least one supporting arm has a lug which fits into the protrusion in the supporting wall.

12. A pair of air duct sections according to claim 10, in which at least one supporting arm has an angular section parallel to a duct wall portion.

13. An air duct section according to claim 5 which the supporting wall has an outwardly extending, continuous protrusions in its part which is furthest away from the duct wall plane.

14. An air duct section according to claim 13, in which the supporting arm has a lug which fits into the protrusion in the supporting wall.

15. An air duct section according to claim 14, in which the supporting arm has an angular section parallel to the duct wall portion.

16. A pair of air duct sections according to claim 8, 9 or 12 in which at least one hollow profile of the connecting flange portion is essentially triangular and the supporting wall is bent back and inclined to the duct wall portion.

17. A pair of air duct sections according to claim 10 or 11, in which at least one hollow profile of the connecting flange portion is essentially triangular and the supporting wall is bent back and inclined to the duct wall portion.

18. An air duct section according to claim 5, 13, or 15, in which the hollow profile of the connecting flange portion is essentially triangular and the supporting wall is bent back and inclined to the duct wall portion.

19. An air duct section according to claim 8, 9, or 12, in which hollow profile of the connecting flange portion is essentially triangular and the supporting wall is bent back and inclined to the duct wall portion, and in which said continuous connection folded seam is comprised of a connecting arm of said duct wall portion butting against the free edge of the supporting wall and lies in the plane of the duct wall portion.

20. An air duct section according to claim 10, 11, of 14, in which the hollow profile of the connecting flange portion is essentially triangular and the supporting wall is bent back and inclined to the duct wall portion, and in which said continuous connecting folded seam is comprised of a connecting arm of said duct wall portion butting against the free edge of the supporting wall and lies in the plane of the duct wall portion.

21. An air duct section according to claim 5, 13, or 15, in which the hollow profile of the connecting flange portion is essentially triangular and the supporting wall is bent back and inclined to the duct wall portion, and in which said continuous connecting folded seam is comprised of a connecting arm of said duct wall portion butting against the free edge of the supporting wall and lies in the plane of the duct wall portion.

* * * * *